INVENTOR.
GERALD C. CONGROVE

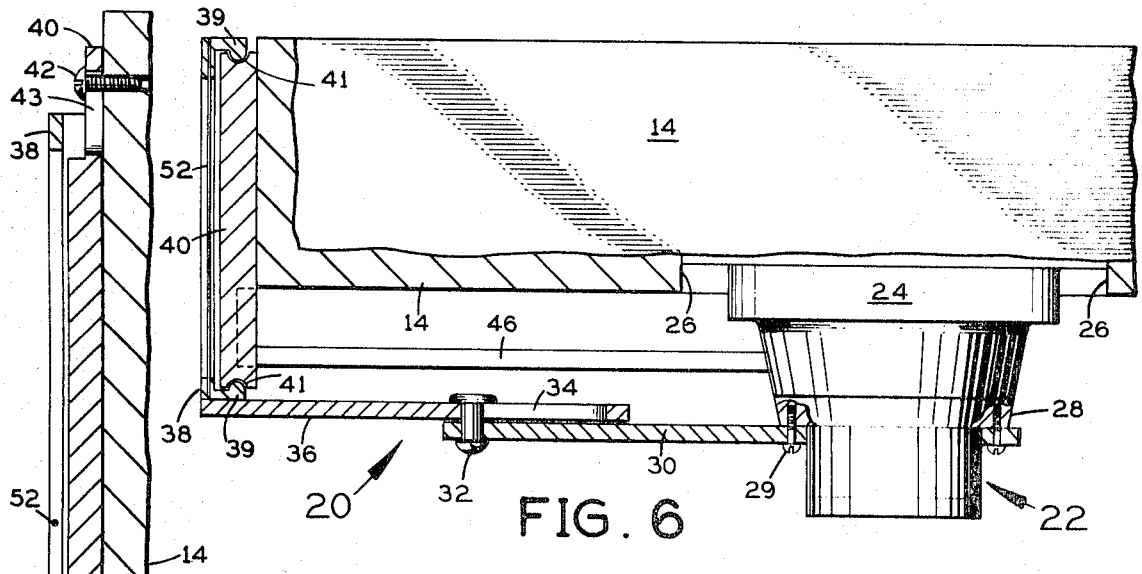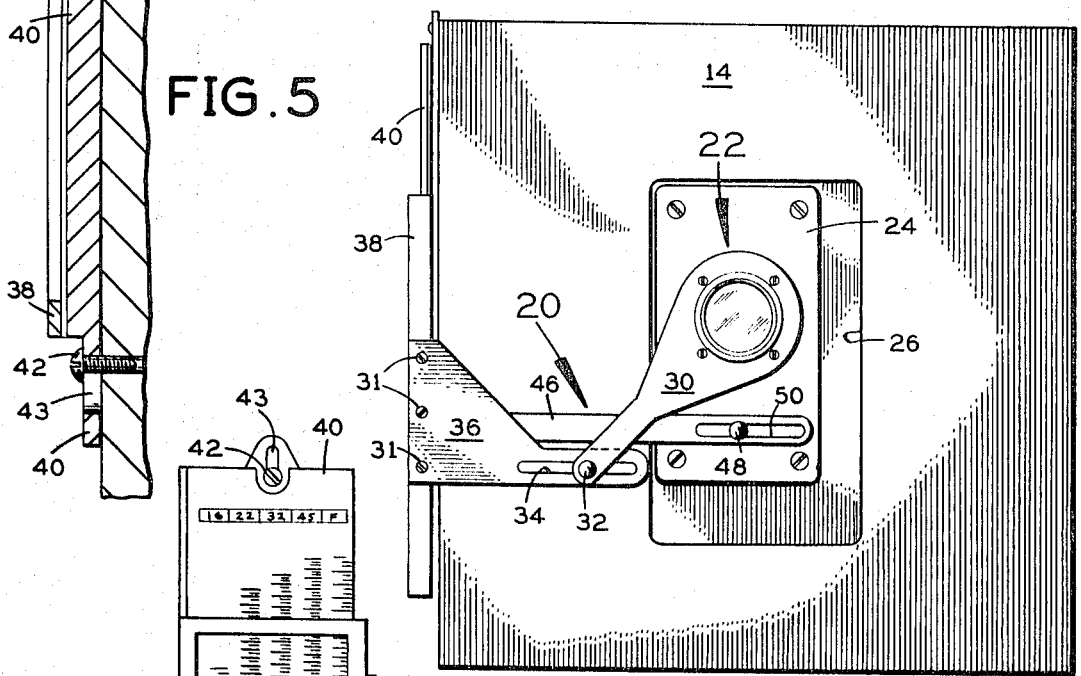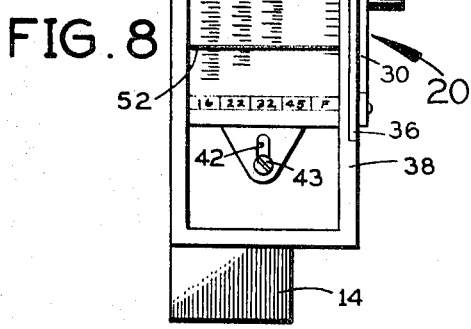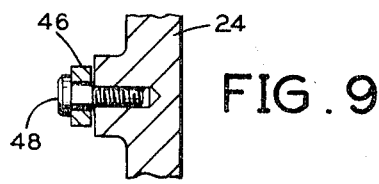
INVENTOR.
GERALD C. CONGROVE

Nov. 9, 1971   G. C. CONGROVE   3,618,502
DEVICE FOR ADJUSTING DIAPHRAGM OF CAMERA
Filed Aug. 5, 1969   3 Sheets-Sheet 3

INVENTOR.
GERALD C. CONGROVE
BY
*Settle and Oltman*

United States Patent Office 3,618,502
Patented Nov. 9, 1971

3,618,502
DEVICE FOR ADJUSTING DIAPHRAGM OF CAMERA
Gerald C. Congrove, 1481 S. Ocean Blvd.,
Pompano Beach, Fla. 33062
Filed Aug. 5, 1969, Ser. No. 847,583
Int. Cl. G03b 5/02, 9/02, 17/12
U.S. Cl. 95—64 R
7 Claims

ABSTRACT OF THE DISCLOSURE

A device for adjusting the diaphragm control of a process camera from a position remote from the lens assembly of the camera so as to provide better access for making the adjustments. The device includes a scale mounted for movement relative to a lens board of the camera and readily accessible for viewing. An indicator can be moved relative to the scale and also moves with the scale. The scale and the indicator are respectively coupled to the lens assembly and the diaphragm control by arm linkages which permit movement of the lens assembly of the camera without relative movement between the scale and the indicator. Relative movement between the scale and indicator rotates the diaphragm control to any desired setting of the diaphragm.

BACKGROUND OF THE INVENTION

The invention relates to adjustment of the diaphragm of a camera, and particularly a process camera.

Process cameras are useful in a variety of ways, but one particular use is to photograph copy to provide a negative for use in printing the copy in a newspaper, magazine or the like. The copy is mounted on a copy board in front of the camera, and the lens of the camera is movable in a vertical plane so that it can be directed, if desired, to photograph only a portion of the copy or alternatively to photograph copy which is mounted in an offset position. The negative resulting from the photograph must be the same size as the printing to be made from it. On the other hand, the original copy is often larger or smaller than the negative which is to be made. Obviously, then, it is necessary to provide a capability for reduction or enlargement in the process of taking the photograph.

In order to provide for such reduction and enlargement in the taking of a photograph, the lens of the process camera is mounted in a lens board which is movable toward and away from the copy board, and the copy board is also movable toward and away from the lens board. A scale is provided, or often two scales, making it possible to set the copy board at a position required for a desired percentage of reduction or enlargement and also set the lens board at a corresponding position for the same degree of reduction or enlargement.

After the lens has been properly positioned to line up with the copy, it is necessary to adjust the diaphragm of the lens to provide the right setting for the diaphragm for the degree of reduction or enlargement which has been selected and also for the f-stop which has been selected. The lens assembly is often provided with a rotary control which can be rotated to adjust the diaphragm, and the rotary control has a pointer which lines up with a scale mounted directly adjacent the lens assembly.

One difficulty with this arrangement is that the photographer must get into a position in front of the lens assembly where he can see the scale in order to set the diaphragm control and the pointer thereof at the desired setting. With a large camera, the lens assembly and scale is often quite inaccessible, and as a consequence, considerable time and effort are wasted in attempting to manipulate the diaphragm control and at the same time view the pointer and scale from a somewhat remote position.

OBJECTS OF THE INVENTION

It is a general object of the present invention to provide an improved device for adjusting the diaphragm control of a process camera.

Another object of the invention is to provide an adjusting device which can be manipulated easily at a position remote from the lens assembly of a process camera, but which is coupled through linkages to the diaphragm control on the lens assembly to facilitate adjustment thereof.

A further object of the invention is to provide an adjusting device for the diaphragm control of a camera which permits setting of the diaphragm by reference to a scale mounted at a position remote from the lens assembly and readily accessible for viewing, the device allowing for movement of the lens assembly without changing the setting of the diaphragm control.

Still another object of the invention is to provide an adjusting device for the diaphragm control of a camera in which a movable scale and a movable indicator are mounted on one side of the lens board of the camera and are coupled to the diaphragm control and the lens assembly so that relative movement between the scale and the indicator adjusts the diaphragm, and both the indicator and the scale move with the entire lens assembly as it is positioned for proper photographing of copy.

Other objects of this invention will appear from the following description and appended claims, reference being had to the accompanying drawings forming a part of this specification wherein like reference characters designate corresponding parts in the several views.

On the drawings:

FIG. 5 is a fragmentary sectional view taken along line 5—5 of FIG. 4;

FIG. 6 is a fragmentary horizontal sectional view taken along line 6—6 of FIG. 2;

FIG. 7 is an elevational view similar to FIG. 2, but showing the adjusting device in a changed position;

FIG. 8 shows the scale and indicator of the adjusting device in a position corresponding to that of FIG. 7;

FIG. 9 is a fragmentary sectional view of a pin and slot connection taken along line 9—9 of FIG. 2;

Figures 1, 2, 3, 4:
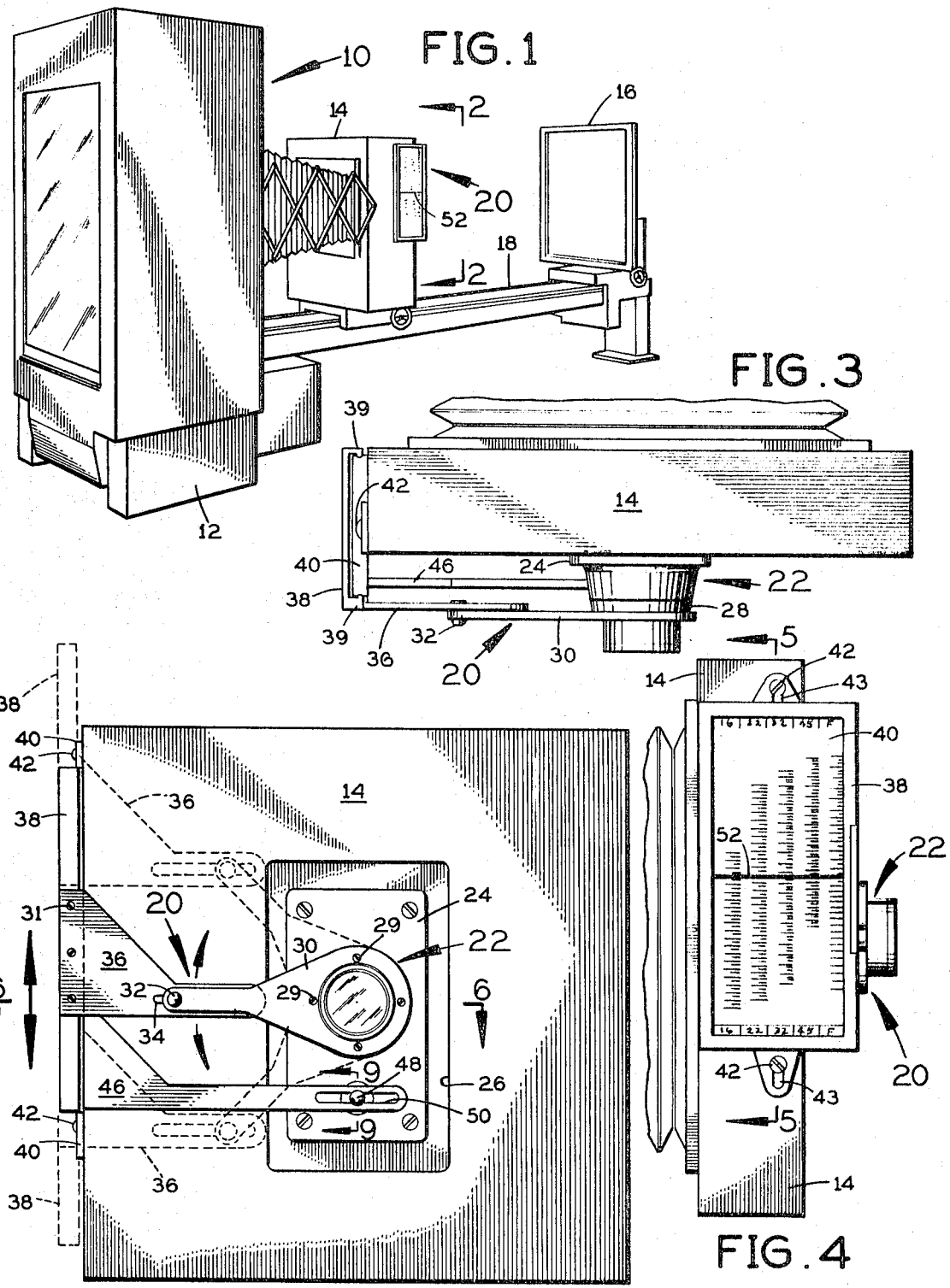
FIG. 1 is a perspective view of a process camera of the general type to which the invention is particularly suited.
FIG. 2 is an elevational view of the lens board section of the camera of FIG. 1 taken along line 2—2 of FIG. 1.
FIG. 3 is a top plan view of the lens board shown in FIG. 2, with both FIG. 2 and FIG. 3 showing the adjusting device in accordance with one embodiment of the invention.
FIG. 4 is a fragmentary side elevational view of the lens board showing a movable scale which is a part of the adjusting device.
Figure 10:
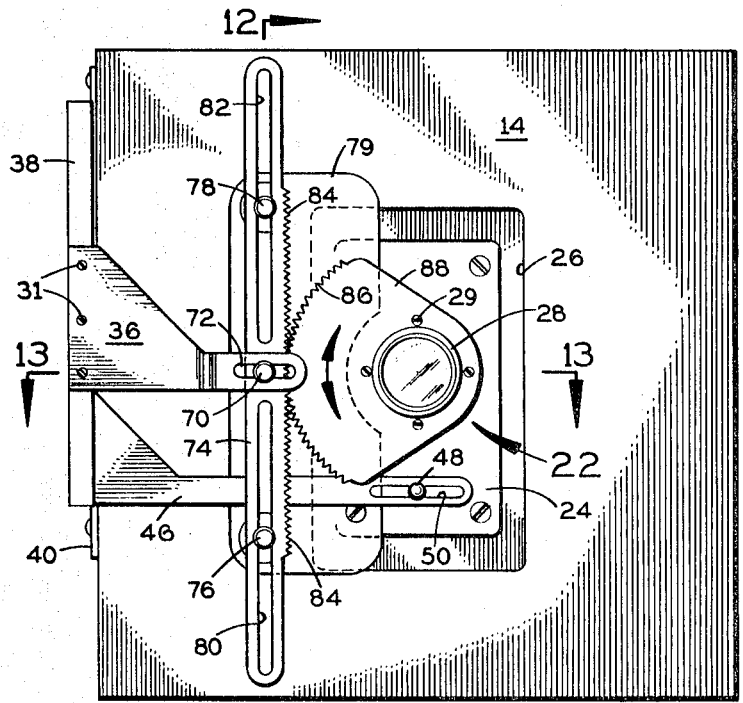
FIG. 10 is an elevational view of the lens board of a camera similar to the lens board of FIG. 2, but showing a different embodiment of the adjusting device of the invention.
Figure 12:
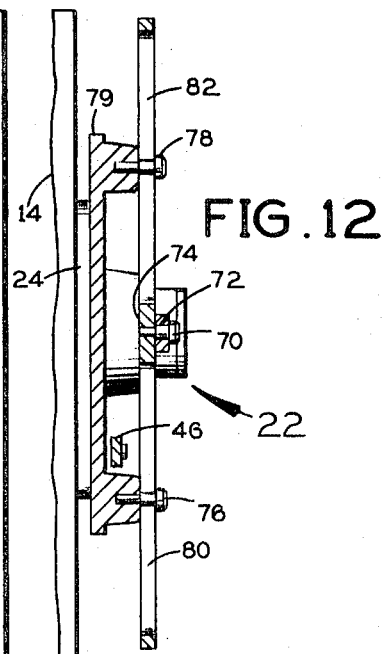
FIG. 12 is a vertical sectional view taken along line 12—12 of FIG. 10.
Figure 11:
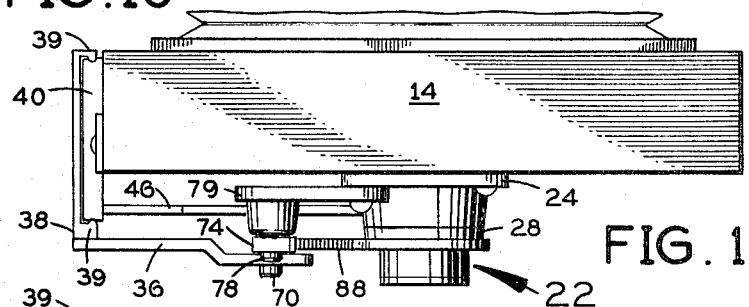
FIG. 11 is a top plan view of the lens board and adjusting device of FIG. 10.
Figure 13:
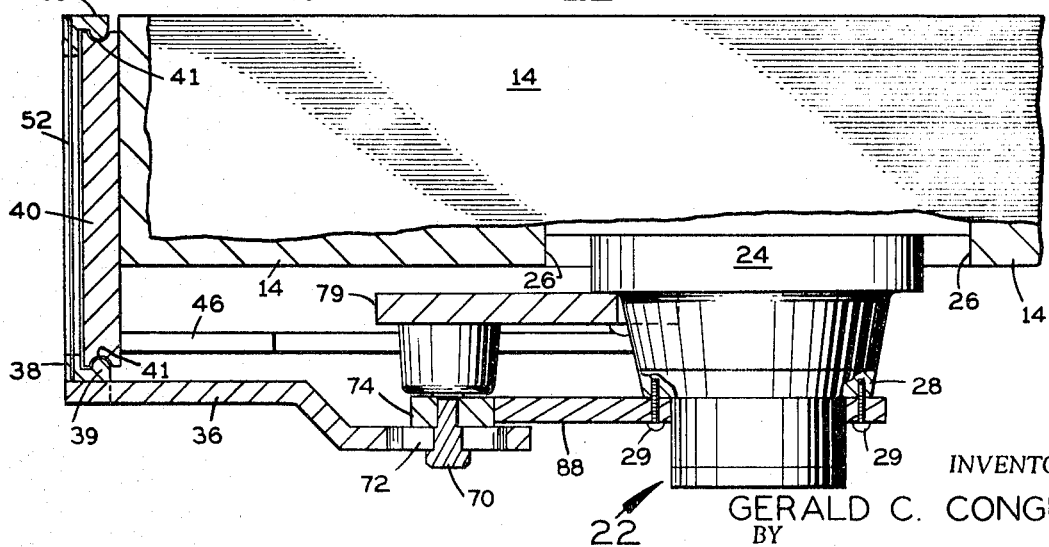
FIG. 13 is a horizontal sectional view taken along line 13—13 of FIG. 10.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

The process camera 10 shown in the drawings is adapted to have the back 12 thereof mounted in a darkroom, with the lens board 14 and the copy board 16 outside of the darkroom in the camera room. It is not essential to have the back of the camera associated with a darkroom. The lens board 14 and the copy board 16 are both movable lengthwise along a track 18, and the track 18 is ordinarily provided with two scales running lengthwise from about the middle of the track toward the lens board 14 and the copy board 16.

When the photographer is taking a photograph of copy which is mounted on the copy board 16, he sets the position of the copy board 16 and the position of the lens board 14 to achieve a desired percentage of reduction or enlargement of the copy so that a negative may be provided which will be exactly the right size for printing. After this adjustment has been made, it is necessary to adjust the diaphragm of the lens assembly of the camera so that the diaphragm is adjusted properly for a selected f-stop and percentage of reduction or enlargement. The adjusting device of the invention allows this adjustment to be made from a position remote from the lens assembly at which the adjusting device and its scale are readily accessible, as will be described further.

The adjusting device is identified generally as 20 in FIGS. 1 through 9, and it is associated with a lens assembly 22 mounted on the copy board 16. The lens assembly 22 is mounted on a lens plate 24 (see FIG. 2) which is movable in all directions of a vertical plane within the confines of the opening 26 in the front of the copy board. This movement of the lens assembly 22 and plate 24 is achieved by means of controls provided in the darkroom which do not form a part of the present invention. The reason for moving the lens assembly is to enable the photographer to photograph only a selected portion of the copy board 16 or the copy thereon.

The lens assembly 22 has a diaphragm control ring 28 which can be rotated to adjust the setting of the diaphragm of the lens assembly. Attached to the diaphragm control ring 28 as with screws 29 is an arm 30 which is connected by a pin 32 to a horizontal slot 34 in another arm 36. The arm 36 is affixed as with screws 31 to an indicator assembly 38 which is movably mounted on a scale 40 provided at the far left side of the lens board 14 as shown in the drawings. The scale 40 and indicator assembly 38 are readily accessible for viewing by the photographer when he is making the adjustment of the diaphragm control. The indicator 38 may have lips 39 slidably received in grooves 41 of the scale to permit relative movement of the scale and indicator with any given position being maintained by friction.

The scale 40 is in turn mounted for vertical movement on the side of the lens board 14 by means of screws 42 (see particularly FIG. 4) which are received in vertical slots 43 provided in extensions of the scale 40. The screws 42 provide enough pressure on the wings in which the slots 43 are formed so as to hold the scale in any selected vertical position, but the scale can be moved up and down as needed.

Attached to the scale 40 is an arm 46 which in turn is connected by means of a pin 48 in a horizontal slot 50 provided in the arm 46. The pin 48 is affixed to the lens plate 24 as shown in FIG. 9 so that any vertical movement of the lens plate 24 will cause the arm 46 and the scale 40 to move vertically and will also cause arms 30 and 36 and indicator assembly 38 to move vertically by the same amount. The pin and slot connection 32, 34 and the other pin and slot connection 48, 50 make it possible for the lens assembly 22 to move horizontally without affecting the position of the scale 40 and the indicator assembly 38. When the scale 40 and indicator 38 move vertically as a result of vertical movement of the lens assembly 22, it is important to note that the relative positions of the scale 40 and indicator assembly 38 do not change.

In order to adjust the diaphragm control 28, the indicator assembly 38 is moved relative to the scale 40 until the indicating hairline 52 is lined up with the selected percentage reduction or enlargement for the f-stop setting which has been selected. In FIGS. 4 and 8, it may be seen that the scale 40 is provided with four sections labelled 16, 22, 32 and 45 and these latter numbers indicate f-stop settings for the lens assembly. Each of these scale sections is graduated according to percentage reduction or enlargement, so the indicating hairline 52 is lined up with the selected percentage reduction or enlargement for the particular section of the scale which has been selected as the required f-stop. As the indicator assembly 38 is moved vertically relative to scale 40, the arms 36 and 40 transmit this motion into rotary motion of the diaphragm control ring 28 which in turn adjusts the diaphragm of the camera. It may be noted that it would be possible to connect the scale 40 to the diaphragm control ring and the indicating assembly 38 to the lens plate 24 to provide a reverse arrangement of scale and indicator. However, this is not recommended.

Since the arm 30 moves in a rotational manner, it is apparent that at the vertical extremes of travel of this arm there will be some lesser degree of vertical motion than at the midpoint of the range. This requires that the scale on the scale member 40 be compressed and extended properly to compensate for this particular motion of arm 30.

The embodiment of FIGS. 10 through 13 is designed to provide vertical motion of the arm 36 without any correction required for rotary motion of the diaphragm control ring 28. This is accomplished by connecting the arm 36 with a pin 70 in a horizontal slot 72 on the arm 36, the pin 70 being affixed to another arm 74 which is mounted for vertical movement on pins 76 and 78 received in vertical slots 80 and 82 in the arm 74. Pins 76 and 78 are secured to a plate 79 which is affixed to the lens plate 24. The arm 74 has teeth 84 at the right edge thereof which mesh with teeth 86 on an arm 88 which is affixed to the diaphragm control ring 28 in the same manner that arm 30 is affixed to diaphragm control ring 28 in FIGS. 1 through 9.

The arm 36 is again attached to the indicator assembly 38, and the scale 40 is connected by the same arm 46 to the lens plate 24 in the manner which has been described previously in connection with FIG. 2.

Thus, vertical motion of the lens assembly 22 causes the indicator assembly 38 and the scale 40 to move together in the vertical direction without changing the relative position of the scale and the indicator assembly. When it is desired to set the diaphragm control of the camera, the indicator assembly 38 is moved vertically relative to the scale 40 to the desired setting thereof as previously described, and this vertical motion of indicator assembly 38 causes arm 74 to move vertically on the pins 76 and 78 so as to rotate the arm 88 as a result of the meshing of the gear teeth 84 and 86. Any horizontal movement of the lens assembly 22 is taken up by the pin and slot connection 70, 72 and the other pin and slot connection 48, 50.

From the foregoing description, it is apparent that the invention provides a remote reading adjusting device for adjusting the diaphragm of a camera, and particularly a process camera, which allows setting of the diaphragm to achieve a desired percentage of reduction or enlargement for a selected f-stop setting at a position remote from the lens assembly of the camera. This considerably facilitates adjustment of the diaphragm of the camera.

Having thus described my invention, I claim:

1. A device for adjusting the diaphragm of a camera, the diaphragm being part of a lens assembly which is movable in a vertical plane relative to a lens board and with a rotary control being coupled to the diaphragm to be rotated to adjust the diaphragm, said adjusting device comprising a scale mounted on the lens board so as to be readily accessible at one side of said camera for viewing, said scale being movable vertically relative to said lens board, first arm means coupling said scale to said lens assembly for joint vertical movement thereof together, said first arm means having means providing an adjustable coupling to permit horizontal movement of said lens assembly relative to said scale, an indicator movable vertically relative to said scale to select a given scale reading corresponding to a desired f-stop setting and percentage reduction or enlargement, and second arm means coupling said indicator to said rotary control for translating vertical motion of said indicator into rotary motion of said control to thereby permit adjustment of the diaphragm by manipulation of said indicator, said second arm means also having means providing an adjustable coupling to permit horizontal movement of said lens assembly relative to said indicator.

2. A device for adjusting the diaphragm of a process camera, the diaphragm being part of a lens assembly which is movable in a vertical plane relative to a lens board and with a rotary control structure being coupled to the diaphragm to be rotated to adjust the diaphragm, said adjusting device comprising a scale mounted on the lens board at one side thereof in a plane parallel to the rotational axis of said rotary member so as to face sidewise away from said lens assembly and be readily accessible at one side of said camera for viewing, said scale being movable vertically relative to said lens board, first arm means coupling said scale to said lens assembly for joint vertical movement together, said first arm means having horizontal slot and pin means providing an adjustable coupling to permit horizontal movement of said lens assembly relative to said scale, an indicator mounted over said scale and movable vertically relative to the same to select a given scale reading corresponding to a desired f-stop setting and percentage reduction or enlargement, and second arm means coupling said indicator to said rotary control structure for translating vertical motion of said indicator into rotary motion of said control structure to thereby permit adjustment of the diaphragm by manipulation of said indicator, said second arm means also having horizontal slot and pin means providing an adjustable coupling to permit horizontal movement of said lens assembly relative to said indicator.

3. An adjusting device for a movable diaphragm control of a camera which has a lens assembly movable in a vertical plane with respect to a lens board, the diaphragm control being movable rotationally to adjust the diaphragm, said adjusting device comprising first arm means coupled to said lens assembly for movement with said lens assembly in vertical directions, second arm means coupled to said diaphragm control also for movement with said lens assembly in vertical directions, each of said arm means including pin and slot means allowing horizontal movement of said lens assembly relative to a portion of each arm means, a scale coupled to one of said arm means for vertical movement therewith, and an indicator coupled to the other of said arm means and movable vertically relative to said scale to a desired setting thereof with said arm means serving to translate vertical relative motion between said indicator and said scale into rotary motion of said diaphragm control to set said diaphragm according to the relative position of said indicator and said scale, and means movably mounting said scale on said lens board in an accessible position at one side thereof.

4. An adjusting device as claimed in claim 3 in which said second arm means includes one arm connected to said indicator and another arm operatively connected to said rotary control, said arms having pin and slot means interconnecting the same to permit horizontal motion of said lens assembly relative to said indicator.

5. An adjusting device as claimed in claim 4 in which said other arm comprises a simple lever arm.

6. An adjusting device as claimed in claim 4 in which said other arm and said rotary control have meshing gear means translating linear motion of said other arm into rotary motion of said control, and said device includes means mounting said other arm for movement relative to said control.

7. An adjusting device as claimed in claim 6 in which said mounting means comprises pin and slot means.

References Cited
UNITED STATES PATENTS

| | | | |
|---|---|---|---|
| 1,512,514 | 10/1924 | Whiteside | 95—64 X |
| 2,113,892 | 4/1938 | Lehman | 95—64 |
| 2,124,248 | 7/1938 | Franicel | 95—64 X |
| 2,406,550 | 8/1946 | Long | 95—64 |
| 2,593,216 | 4/1952 | Sussin | 355—61 |
| 3,448,673 | 6/1969 | Singer et al. | 95—64 |

JOSEPH F. PETERS, JR., Primary Examiner

U.S. Cl. X.R.

95—44 R; 355—61